Feb. 12, 1935. O. E. RHODES ET AL 1,990,709
VALVE FOR FLUSHING HOT WATER TANKS AND COILS
Filed March 12, 1934 2 Sheets-Sheet 1
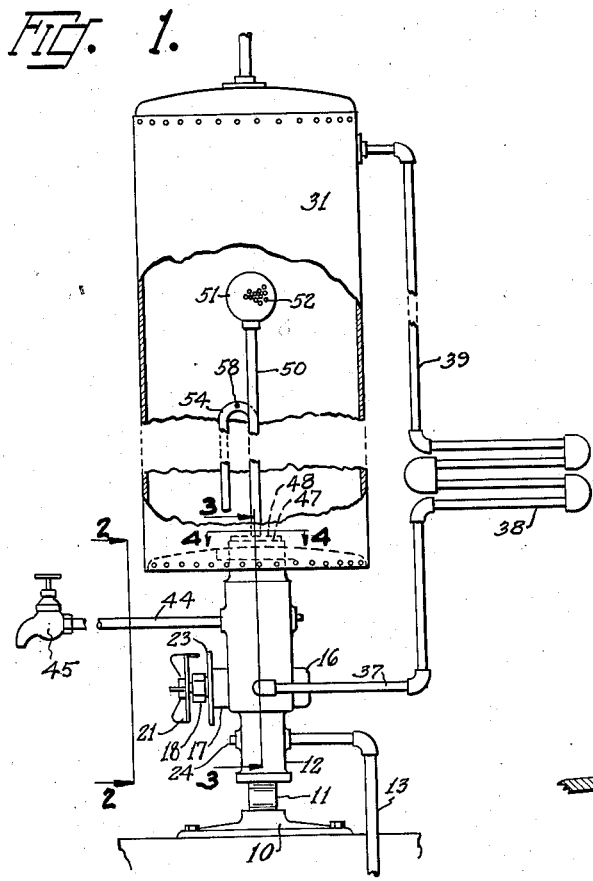
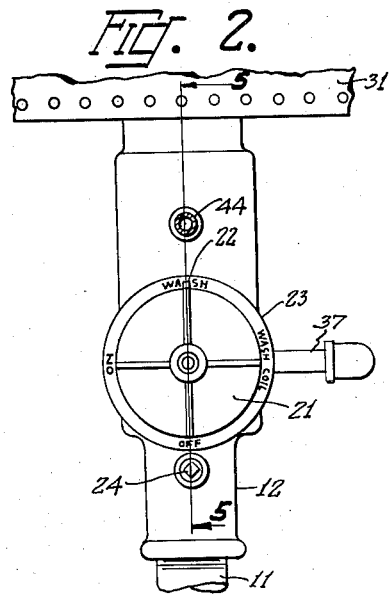
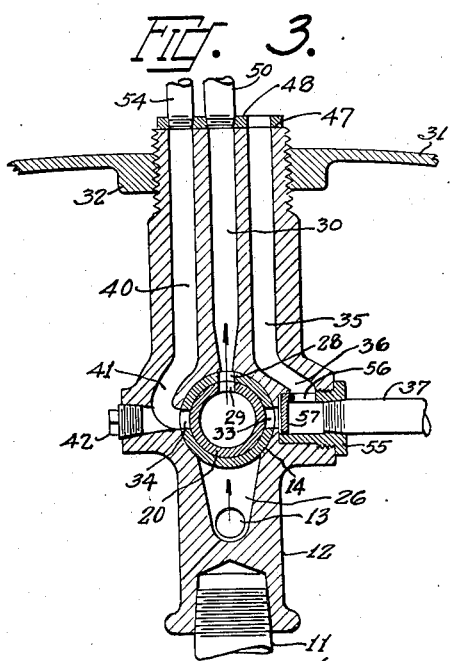
INVENTORS
O. E. RHODES
F. L. ROCKWELL
BY
ATTORNEY Feb. 12, 1935.  O. E. RHODES ET AL  1,990,709
VALVE FOR FLUSHING HOT WATER TANKS AND COILS
Filed March 12, 1934  2 Sheets-Sheet 2
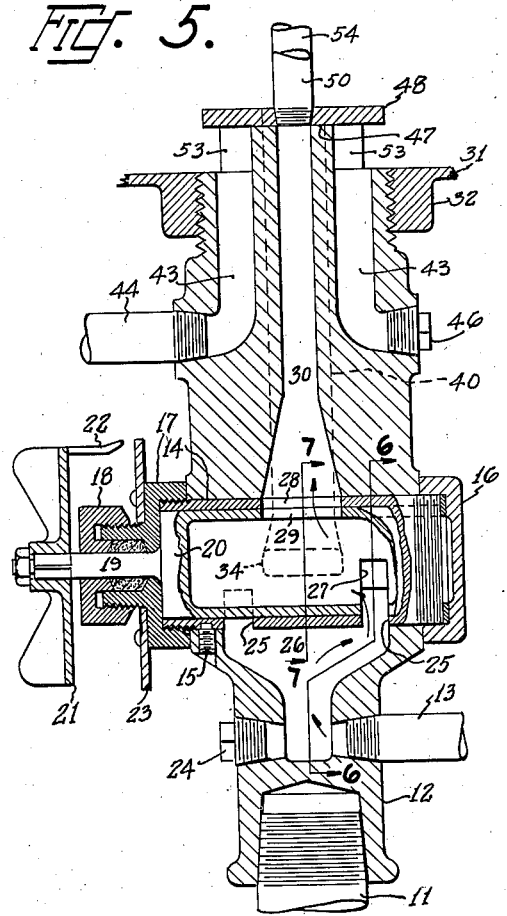
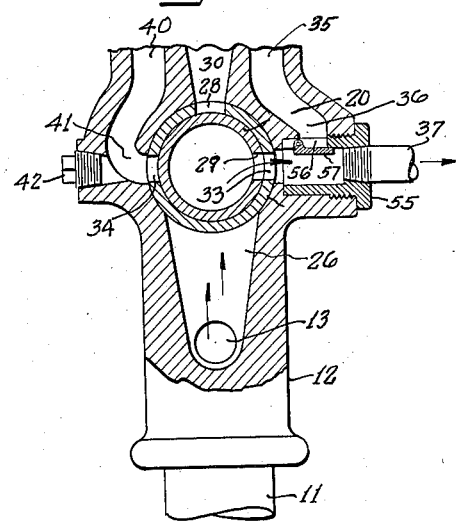
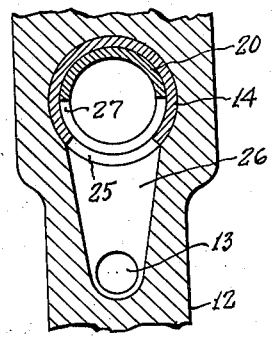
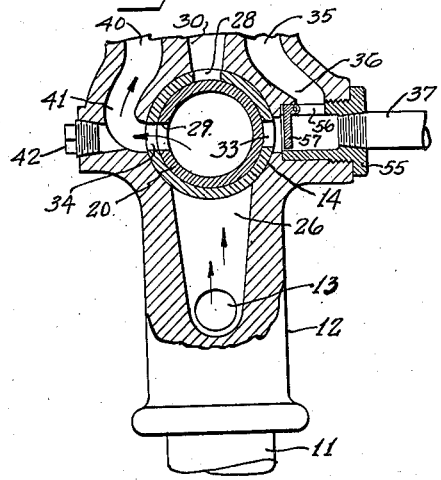
INVENTORS
O. E. RHODES
F. L. ROCKWELL
BY
ATTORNEY Patented Feb. 12, 1935

1,990,709

UNITED STATES PATENT OFFICE 1,990,709

VALVE FOR FLUSHING HOT WATER TANKS AND COILS

Omer E. Rhodes, Aberdeen, and Frank L. Rockwell, Cosmopolis, Wash.

Application March 12, 1934, Serial No. 715,142

6 Claims. (Cl. 122—379)

This invention relates generally to hot water tanks, and particularly to a valve for flushing the tank and coil.

The main object of this invention is to provide an exceedingly simple form of tank stand and valve combined whereby water may be admitted to the tank or cut off therefrom, or the tank may be flushed and drained for the removal of scale, or the heating coil itself may be flushed.

The second object is to increase the life of the tank and coil elements by making it possible to easily remove the scale and sediment therefrom, and also making it possible to provide hot water which is freer from impurities than is water from a tank in which scale and sediment is permitted to accumulate throughout the life of the tank.

These, and other objects, will become more apparent from the specification following as illustrated in the accompanying drawings, in which:

Fig. 1 is a side elevation of the device showing the tank shortened and broken away to disclose the parts therein.

Fig. 2 is a section taken along the line 2—2 in Fig. 1.

Fig. 3 is a section taken along the line 3—3 in Fig. 1 showing the valve turned to wash the tank.

Fig. 4 is a section taken along the line 4—4 in Fig. 1.

Fig. 5 is a section taken along the line 5—5 in Fig. 2.

Fig. 6 is a section taken along the line 6—6 in Fig. 5.

Fig. 7 is a section taken along the line 7—7 in Fig. 5 showing the valve set to wash the coil.

Fig. 8 is also taken along the line 7—7 in Fig. 5 but showing the valve set to supply the tank.

Similar numbers of reference refer to similar parts throughout the several views.

Referring in detail to the drawings, there is shown a base 10 which supports a pipe standard 11 on whose upper end is threaded the valve body 12 into which extends a supply pipe 13 through which cold water can enter the hot water system from a source of supply.

Extending horizontally through the body 12 is a cylindrical bushing 14 which is held against rotation within the body 12 by means of a set screw 15. The bushing 14 is threaded at each end, one end having a cap 16 threaded thereon and the other end having a stuffing box 17 threaded thereon.

The box 17 has a gland nut 18 through which extends a stem 19 of the sleeve 20 which journals in the bushing 14. The stem 19 has secured on the outer end thereof a handle 21 provided with an indicator 22 which points toward the dial 23 and has formed on the outer edge thereof the characters reading "On", "Off", "Wash coil" and "Wash". These are preferably shown on opposite sides of the dial 23 in order that the device may be reversed—that is, the positions of the box 17 and the cap 16 can be reversed to accommodate the valve to a given installation.

It is noted that the pipe 13 can be inserted from either side of the body 12, the unused inlet being closed by a plug 24.

The bushing 14 is provided with transverse slots 25 on opposite sides of the middle of its length. These slots communicate at all times with the passageway 26 which is supplied with water by the pipe 13. The sleeve 20 is provided with a slot 27 which registers with one of the slots 25.

The bushing 14 and the sleeve 20 are provided with ports 28 and 29 which register with each other and with the passageway 30 when the slot 27 is in the position shown in Fig. 5—that is, when water from the supply pipe 13 is being used to wash out the interior of the tank 31 whose bottom 32 is threaded onto the upper end of the body 12.

The bushing 14 is also provided with ports 33 and 34 which are diametrically opposite from each other and equi-distant from the port 28.

Formed in the body 12 and communicating with the port 33 is the vertical passageway 35 whose lower end 36 communicates with the port 33, and also with the pipe 37 leading to the coil 38 whose riser 39 connects with the upper portion of the tank 31.

The port 34 communicates with the vertical passageway 40 whose lower end 41 connects with the port 34 and also with a plugged opening 42, the purpose of which is to make it possible to connect the pipe 37 to either side of the body 12. Vertical drain passages 43 are formed at the upper end of the body 12, and one of the lower ends thereof communicates with a drain pipe 44, preferably provided with a valve 45, while the other drain passage 43 is closed by a plug 46.

It will be noted that the top 47 of the body 12 is somewhat above the bottom of the tank 31, and there is placed upon the top surface 47 a flat plate 48 which is secured to the body 12 by means of the screws 49. In the center of the plate 48 is threaded a spray pipe 50 on whose upper end is mounted a perforated spray nozzle 51 whose openings 52 are of a character and number to insure the entire interior of the tank 31 being thoroughly washed when water is discharged from the nozzle 51. The pipe 50 communicates with the passageway 30.

The upper end of the body 12 is cut away along the lines 53 to provide lateral communication with the drain passages 43. The downturned filler pipe 54 is also threaded into the plate 48 and communicates with the passageway 40.

The operation of the device is as follows: When the indicator 22 is turned to the "on" position then the port 29 will register with the port 34 and water will pass upwardly through the passageway 40 and through the pipe 54 into the tank 31 to replace any which has been withdrawn therefrom. This is illustrated in Fig. 8.

If it is desired to flush the coil 38 then the indicator 22 is turned to the position marked "Wash coil", and the port 29 will register with the port 33 which communicates with the coil 38, blowing the contents of same through the tank 31 from which it is drained off through the drain outlet by way of the valve 45.

If it is desired to wash the tank itself then the indicator 22 is turned to the position marked "Wash" (as shown in Figs. 2 and 3) in which the port 29 communicates with the passageway 30 and water is forced violently against the interior of the tank 31, and this is drained off through the valve 45.

It can thus be seen that while the device is very simple to construct it is possible to adapt it to a wide range of conditions, and that by means of its use it is possible to selectively supply the tank with water, or cut off the supply, or wash either the coil or tank and drain the impurities therefrom.

It is sometimes desirable to provide a means for preventing the upward flow of water through the passage 36 while the coil 38 is being washed. This is accomplished by introducing a bushing 55 provided with a side outlet 56 under which is hinged the check valve 57. The valve 57 will normally hang in the position shown in Fig. 8, but will assume the position shown in Fig. 7 when the coil is being washed.

Obviously, any other suitable form of check valve could be employed without departing from the spirit of the invention.

It will also be understood that the corresponding opening illustrated as being closed by the plug 42 would necessarily be enlarged and closed by a plug equaling in diameter the bushing 55.

It is also desirable to provide the pipe 54 with a small hole 58 to prevent the siphoning of the water out of the tank, for example, when repairs are being made.

We claim:

1. A flush valve for hot water tanks and coils comprising a body having connections to a supply pipe, to the coil, and to a tank washing nozzle, and a valve for directing water from said supply pipe either through said nozzle, or through the coil, or into the tank itself.

2. A flush valve for hot water tanks and coils comprising a valve body constituting a stand for supporting a hot water tank upon a base, passageways between the upper end of said body and the intermediate portion thereof, a rotatable valve at the lower end of said passageways adapted to receive water from a source of supply and discharge said water through one of said passageways, one of said passageways constituting a connection between the hot water coil and the tank, and a check valve so positioned as to prevent flow into the tank through said last mentioned passageway when said rotatable valve is turned to connect said supply with said last mentioned passageway to thus discharge water through the heating coil.

3. A flush valve for hot water tanks and coils comprising an upright body having a supporting stand at its lower end and a tank connection at its upper end, said body having a supply water inlet at its lower end, a tank supply channel between the supply pipe and the upper end of said body, a tubular rotary valve in said body adapted to close the tank supply line, or to discharge water through the hot water coil, or to spray water against the interior of the tank by means of a nozzle associated therewith, said body having the necessary passageways between said rotary valve, the coil, and tank for the purpose mentioned.

4. The substance of claim 3, together with a drain valve communicating with a drain passage in said valve body by means of which the tank mounted on said body may be drained.

5. The combination of a stand, a valve body mounted on said stand, a tank mounted on said body, a rotary valve in said body, a supply connection at the lower end of said body, a downturned supply pipe mounted on the upper end of said body extending into said tank and having its inlet end communicating through said body with said first mentioned supply pipe, a spray nozzle mounted within said tank having a pipe communicating with said valve, a hot water coil having its return pipe communicating with said valve, means for selectively positioning said valve so that water from said supply pipe shall flow therethrough into the downturned tank supply pipe or that water may flow through said valve and be discharged from said nozzle or that water may flow through said valve and be discharged through said coil, and means for draining the water from the bottom of said tank.

6. A valve as described in claim 5 including a check valve disposed in return line of said hot water coil adapted to close against the upward flow of water through said return line into said tank.

OMER E. RHODES.
FRANK L. ROCKWELL.